United States Patent [19]

Dexter et al.

[11] 4,025,487

[45] May 24, 1977

[54] COMPOSITIONS STABILIZED WITH 4-AROYLAMIDO-2-ALKYL-6-T-BUTYL-PHENOLS

[75] Inventors: Martin Dexter, Briarcliff Manor; Martin Knell, Ossining, both of N.Y.

[73] Assignee: Ciba-Geigy Corporation, Ardsley, N.Y.

[22] Filed: June 30, 1975

[21] Appl. No.: 591,560

Related U.S. Application Data

[60] Division of Ser. No. 377,875, July 9, 1973, abandoned, which is a continuation-in-part of Ser. No. 136,617, April 22, 1971, abandoned, which is a continuation-in-part of Ser. No. 820,644, April 30, 1969, abandoned.

[52] U.S. Cl. .................. 260/45.9 NC; 260/559 R; 260/808
[51] Int. Cl.² ............................................. C08K 5/20
[58] Field of Search .................... 260/45.9 NC, 808

[56] References Cited

UNITED STATES PATENTS

| | | | |
|---|---|---|---|
| 2,654,722 | 10/1953 | Young et al. | 260/562 A |
| R26,158 | 2/1967 | Tholstrup | 260/45.9 NC |

OTHER PUBLICATIONS

Polymer Engineering and Science – July 1966, pp. 231–239.

Primary Examiner—V. P. Hoke
Attorney, Agent, or Firm—Nestor W. Shust

[57] ABSTRACT

4-Aroylamido-2-alkyl-6-t-butylphenols can be prepared by reacting 2-alkyl-6-t-butyl-4-aminophenol with an aroylhalide. The products are useful as stabilizers of organic materials subject to thermal and ultraviolet light degradation and especially useful as butadiene rubber stabilizers.

5 Claims, No Drawings

COMPOSITIONS STABILIZED WITH 4-AROYLAMIDO-2-ALKYL-6-T-BUTYLPHENOLS

This is a Divisional of application Ser. No. 377,875 filed on July 9, 1973 now abandoned which is a CIP of Ser. No. 136,617 filed Apr. 22, 1971 now abandoned, which in turn is a CIP of Ser. No. 820,644, filed Apr. 30, 1969, now abandoned.

DETAILED DISCLOSURE

The novel 4-aroylamido-2-alkyl-6-t-butylphenol compounds of the present invention are represented by the formula

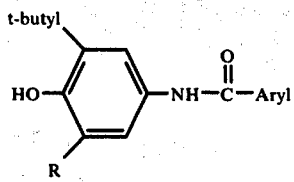

wherein R is methyl or tert.butyl group and aryl is intended to cover aromatic hydrocarbons containing from 6 to 22 carbon atoms such as, for example, phenyl, tolyl, including alkyl substituted phenyl compounds such as, for example, ethylphenyl, nonylphenyl, dodecylphenyl, naphthyl, phenanthryl, anthracenyl, and the like. For practical reasons the preferred aryl group is alkyl substituted phenyl group wherein the alkyl group or groups have up to 9 carbon atoms. The most preferred group is phenyl.

The 4-aroylamido-2-alkyl-6-t-butylphenol compounds of the present invention are prepared by a procedure involving the reaction between 2-alkyl-6-t-butyl-4-aminophenol and an aroylhalide or an alkyl substituted aroylhalide wherein the alkyl group contains from 1 to 18 carbon atoms. The alkylaminophenol starting compound is represented by the formula:

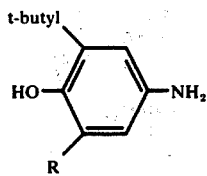

wherein R is methyl or t-butyl. These aminophenols are prepared by the general procedures described in U.S. Pat. No. 3,156,690.

The aroyl halide starting compound is represented by the formula

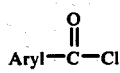

wherein Aryl is defined above.

The reaction is usually carried out in the presence of a non-reactive or chemically inert solvent such as methylene chloride, acetone, benzene, or any solvent in which both reactants are soluble.

Since a hydrogen halide is liberated, the reaction is usually conducted in the presence of an acid acceptor. Suitable acid acceptors include sodium hydroxide, potassium hydroxide, sodium carbonate. triethylamine, and the like.

Equimolar quantities of the aminoalkylphenol and of the acid halide may be used. However, an excess of the acid halide is preferred. The reaction is generally conducted at from below room temperature to a temperature of about 100° C.

The preparation of the desired aroylamidoalkylphenol can also be suitably conducted in the absence of an acid acceptor. Under these conditions, however, a 2:1 equivalence ratio of the aminoalkylphenol to the acid halide is preferred.

In a typical reaction, equimolar amounts of the starting materials, that is, about 0.05 mole of the aminophenol and about 0.05 mole of the aroylhalide, i.e., 4-amino-2,6-di-t-butylphenol and benzoyl chloride are mixed, an acid acceptor is added to the mixture and the resulting reaction mixture is maintained at about room temperature. the desired product that is, 4-benzamido-2,6-di-t-butylphenol is selectively recovered, washed and dried.

The following examples detail the nature of the present invention and are therefore to be considered as illustrative but not limiting the invention.

EXAMPLE 1

11.05 g (0.05 mole) 2,6-di-t-butyl-4-aminophenol is dissolved in 25 ml acetone and 7.03 g (0.05 mole) benzoyl chloride is added thereto. The reaction is exothermic. The mixture is shaken and 10 ml of 5 N sodium hydroxide is added thereto, portionwise, accompanied by agitation. A solid material separates and is allowed to stand for one hour, cooled and there is then added thereto 50 ml water. The mixture is filtered, washed with 50 ml water and then four times each time with 50 ml portions of petroleum ether to remove the red color. The solid material is air dried and there is obtained 14.72 g (a yield of 90.6%) of the 4-benzamido-2,6-di-t-butylphenol product. The solid material is dissolved in 100 ml of 90% ethanol, contacted with a charcoal adsorbent (Darco G-60) and then crystallized. The crystalline material is cooled, filtered, washed with 30 ml cold 90% ethanol and then dried in vacuo over phosphorus pentoxide. The pure product is characterized by a melting point of 209°-210° C.

Analysis Calculated for $C_{21}H_{27}NO_2$:
Calculated: C, 77.50; H, 8.36
Found: C, 77.65; H, 8.25

EXAMPLE 2

Following the procedure described in Example 1 except for the use of α-naphthoyl chloride and 4-amino-2,6-di-t-butylphenol, there was obtained 4-naphthoylamido-2,6di-t-butylphenol, m.p. 232°-233° C.

EXAMPLE 3

Following the procedure described in Example 1 except for the use of o-toluyl chloride, there was obtained 4-o-toluyl-amido-2,6-di-t-butylphenol, m.p. 212°-213° C.

EXAMPLE 4

Following the procedure described in Example 1 except for the use of p-t-butylbenzoyl chloride and 2-t-butyl-6-methyl-4-aminophenol, there was obtained 4-p-t-butyl benzoylamido-2-t-butyl-6-methylphenol, m.p. 192°-193° C.

EXAMPLE 5

Similarly, useing the procedure described in Example 1, there are obtained the following 4-aroylamido-2,6-di-t-butylphenols:

4-nonylbenzamido-2,6-di-t-butylphenol
4-m-octadecylbenzamido-2,6-di-t-butylphenol
4-o,p-dimethylbenzamido-2,6-di-t-butylphenol Another embodiment of this invention is the stabilization of organic materials normally subject to oxidative, thermal and/or ultraviolet light degradation with compounds having the formula

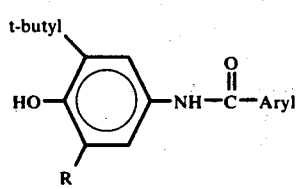

wherein R is methyl or tert-butyl and Aryl is as defined above. R is preferably t-butyl.

Such organic materials include: synthetic organic polymeric substances such as vinyl resins formed from the polymerization of vinyl halides or from the copolymerization of vinyl halides with unsaturated polymerizable compounds, e.g., vinyl esters, $\alpha\beta$-unsaturated aldehydes and unsaturated hydrocarbons such as butadienes and styrene; polyolefins such as polyethylene, polypropylene, polybutylene, polyisoprene, and the like, including copolymers of poly-$\alpha$-olefins, polyurethanes and polyamides such as polyhexamethylene adipamide and polycaprolactam; polyesters such as polymethylene terephthalates; polycarbonates; polyacetals; polystyrene; polyethyleneoxide; and copolymers such as those of high impact polystyrene containing copolymers of butadiene and styrene and those formed by the copolymerization of acrylonitrile, butadiene and/or styrene. Other materials which can be stabilized by the active compounds of the present invention include lubricating oil of the aliphatic ester type, i.e., di(2-ethylhexyl)-azelate, pentaerythritol tetracaproate, and the like; animal and vegetable derived oils e.g., linseed oil, fat, tallow, lard, peanut oil, cod liver oil, castor oil, palm oil, corn oil, cottonseed oil, and the like; hydrocarbon materials such as gasoline, mineral oil, fuel oil, drying oil, cutting fluids, waxes, resins, and the like, fatty acids, soaps, and the like.

The compounds of this invention are effective in compositions providing light stabilization of polyolefins such as polypropylene and polyethylene. It is advantageous to use the compounds of this invention in combination with ultraviolet light absorbers and other types of light stabilizers in a total additive concentration of from 0.05% to 5% and perferably 0.1% to 2%. Illustrative examples of the UV light absorbers are as follows:

2-(3',5'-di-t-butyl-2'-hydroxyphenyl)-5-chlorobenzotriazole
2(2'-hydroxy-5'-methylphenyl)benzotriazole
2-hydroxy-4-methoxybenzophenone
2,2'-dihydroxy-4-methoxybenzophenone
2-hydroxy-4-methoxy-2'-carboxybenzophenone
2,2-hydroxy-4-n-octyloxybenzophenone
2-hydroxy-4-n-octyloxybenzophenone
(2,2'-thiobis(4-t-octylphenolato)-n-butylamine nickel II
5-chloro-2-hydroxybenzophenone
2,4-dibenzoyl-resorcinol
4-tert-butyl-phenylsalicylate phenyl salicylate
2,4-dihydroxybenzophenone
4-dodecyloxy-2-hydroxybenzophenone
p-octylphenyl salicylate
resorcinol monobenzoate
hexamethylphosphoric triamide
2-hydroxy-4-decyloxylbenzophenone
2,2'-dihydroxy-4,4'-dimethoxybenzophenone
2,2', 4,4'-tetrahydroxybenzophenone
ethyl-2-cyano-3,3-diphenyl acrylate
2-ethylhexyl-2-cyano-3,3-diphenyl acrylate
2(2'-hydroxy-5'-methylphenyl)benzotriazole
2(2'-hydroxy:-b 3',5'-di-t-butylphenyl)-7 -chlorobenzotriazole
nickel acetylacetonate
dipropylene glycol salicylate
phenyl salicylate
sucrose benzoate
lauroyl-p-aminophenol
2-(2'-hydroxy-3',5'-di-t-amylphenyl)benzotriazole
nickel-bis{2,2'-thiobix-(4-t-octylphenol)}
nickel-bis(butyldithiocarbonate)
2-hydroxy-4-(2'-hydroxy-3'-methacrylyloxy) propoxybenzophenone
2-hydroxy-4-(2'-hydroxy-3'-acrylyloxy)propoxybenzophenone.

In general, at least one, or more of the stabilizers of the present invention are employed in amounts, in toto, of from about 0.05 to about 5% by weight of the composition containing the organic material. A particularly advantageous range of the present stabilizers for polyolefins such as polypropylene is from about 0.1% to about 2%.

For antioxidant purposes the compounds of this invention are preferably used in combination with synergists. Especially useful for that purpose are di-lauryl-$\beta$-thiodipropionate.

Furthermore, compounds of the formula:

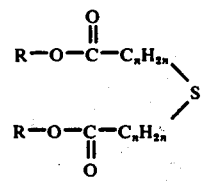

wherein R is an alkyl group having from 6 to 24 carbon atoms; and n is an integer from 1 to 6 are useful stabilizers in combination with the novel antioxidant compounds of the present invention.

Other antioxidants, antiozonants, thermal stabilizers, ultraviolet light absorbers, coloring materials, dyes, pigments metal chelating agents, etc., may also be used in the compositions of the invention.

It should also be mentioned that phosphite esters may also be used in stabilized formulations containing the novel antioxidants of the present invention and such phosphite compounds include dialkyl phosphites such as, for example, distearyl phosphite, di-lauryl phosphite, and the like, trialkyl phosphites such as, for example, trilauryl phosphite.

The aroylamido hindered phenols of this invention are particularly most useful as stabilizers of diene containing rubbers, such as polybutadiene, polyisoprene and SBR (styrene-butadiene rubber). The stabilizers are employed in the amount of from 0.01 to 5% by weight of the diene containing rubber. More preferably, the concentration of the stabilizer is from 0.05 to 2% by weight of the rubber. Additional stabilizers and additives can be added prior to and/or during the manufacturing of the rubber.

The following examples are presented below for the purpose of illustrating the present invention and not for the purpose of limiting it.

EXAMPLE 6

Unstabilized polypropylene powder (Hercules Profax 6501) was thoroughly blended with 0.1% by weight of 4-benzamido-2,6-di-t-butylphenol and 0.3% by weight of di-stearylthiodipropionate (DSTDP). The blended material was then milled on a two roll mill for 5 minutes at 182° C. The milled sheet was compression molded at 220° C into 25 mil thick plaques under a pressure of 175 psi and water cooled in the press.

A half inch by one inch specimen cut from the 25 mil plaques was placed in a forced draft oven at 150° C. The sample was considered to have failed at the first sign of visual decomposition. This usually occurs at a corner which turns brownish and becomes brittle.

The oven life of the above sample was 255 hours. The unstabilized polypropylene has an oven life of about 3 hours and polypropylene stabilized only with 0.3% DSTDP has an oven life of about 50 hours.

EXAMPLE 7

Following the procedure of Example 6, the below indicated compounds were tested with the noted results:

| Compound | Hours |
| --- | --- |
| 4-naphthoylamido-2,6-di-t-butylphenol | 360 |
| 4-o-toluylamido-2,6-di-t-butylphenol | 260 |
| 4-p-t-butyl benzoylamido-2-t-butyl-6-methylphenol | 320 |

EXAMPLE 8

Stabilized rubber is prepared my mixing in the cold:

| | Parts |
| --- | --- |
| Havea latex crepe | 100.00 |
| Stearic acid | 1.5 |
| Zinc oxide | 5.0 |
| Diphenylguanidine | 1.0 |
| Sulfur | 2.5 |
| 4-benzamido-2,6-di-t-butylphenol | 1.0 |

The resultant mixture is vulcanized at 140° C and tested according to ASTM D-1206-52T. It is found that the time required to elongate a test strip from 120 mm to 170 mm is considerably shorter for the unstabilized rubber as compared with the stabilized rubber. Similarly, styrene-butadiene rubber as well as a blend of natural rubber (50 parts) and polybutadiene rubber (50 parts ) are stabilized.

EXAMPLE 9

High impact polystyrene resin containing elastomer (i.e., butadiene-styrene) is stabilized against loss of elongation properties by incorporation of 0.5% by weight of 4-benzamido-2,6-di-t-butylphenol. Under the test conditions described below, the stabilized resin retains a higher percentage of its original elongation properties, whereas the unstabilized resin retains lessened elongation properties.

The unstabilized resin is dissolved in chloroform and the stabilizer than added, after which the mixture is cast on a glass plate and the solvent evaporated to yield a uniform film which, upon drying, is removed and cut up, and then pressed for 7 minutes at a temperature of 165° C and a pressure of 2,000 pounds per square inch into a sheet of uniform thickness (25 mil).The sheets are then cut into strips, approximately 4 × 0.5 inches. A portion of these strips is then measured for length of elongation in the Instron Tensile Tester (Instron Engineering Corporation, Quincy, Mass.). The remaining portion of the strips is aged in a forced draft oven for six weeks at 75° C and thereafter tested for elongation.

Sample Preparation — Gel Content and Test Method

A stabilizer at the indicated concentration level is incorporated into the indicated rubber in a Brabender Plasticorder at 110° C for four minutes under a nitrogen atmosphere. Twenty-five mil thick compression molded plaques, 2 × 1 × 0.025 weighing about 1 gm., are oven aged at 100° C in a forced draft oven. Toluene insoluble measurements are taken periodically. The percent gel content in the sample is calculated using the following expression:

$$\% \text{ Gel} = 100\left(\frac{W_i - 10W_f}{W_i}\right)$$

where $W_i$ is the weight of dissolved rubber sample in 100 ml. toluene at room temperature and $W_f$ is the weight of residue in 10 ml. filtered solution after evaporation of solvent at 80° C.

In polybutadiene rubber with the increase in decomposition there is an increase in cross-linking as a result of which the rubber becomes hard and more brittle. In those rubbers the onset of gel formation which accompanies cross-linking is considered as the beginning of decomposition.

In polyisoprene, on the other hand, chain scission rather than cross-linking takes place with decomposition. Thus, the sample becomes sticky and soft with the onset of decomposition. For this reason in the case of polyisoprene, stickiness and not gel formation is used as the criterian for determining the failure of the sample.

Following the above described procedure, polybutadiene and polyisoprene were stabilized with the indicated amount of the stabilizer as shown in Tables I and II below. The stabilization results are also reported in the Tables.

TABLE I

| Oven Aging of 25 mil Polybutadiene of 100° C | | |
| --- | --- | --- |
| Ex. No. | Concentration of Stabilizer | Hours to Gel |
| 11 | None | 2 |
| 12 | 0.025% 4-benzamido-2,6-di-t-butylphenol | 67 |
| 13 | 0.05% 4-benzamido-2,6-di-t-butylphenol | 95 |
| 14 | 0.10% 4-benzamido-2,6-di-t-butylphenol | 144 |
| 15 | 0.125% 4-benzamido-2,6-di-t-butylphenol | 169 |

TABLE I-continued

Oven Aging of 25 mil Polybutadiene of 100° C

| Ex. No. | Concentration of Stabilizer | Hours to Gel |
|---|---|---|
| 16 | 0.125% 4-o-toluylamido-2,6-di-t-butylphenol | 165 |
| 17 | 0.125% 4-p-t-butylbenzamido-2-t-butyl-6-methylphenol | 37 |

TABLE II

Oven Aging of 25 mil Polyisoprene at 70° C

| Ex. No. | Concentration of Stabilizer | Hours to Stickiness |
|---|---|---|
| 18 | None | Ca. 2 |
| 19 | 0.1% 4-benzamido-2,6-di-t-butylphenol | Ca. 31 |

Procedure

Resin acid salt emulsions of the stabilizers were added to the latex (Part A, 300 gm) with stirring. To this mixture 27.03 g. Part B and 6.70 gm Part C were added very slowly and the mixture was stirred vigorously for two minutes followed by slow stirring for one minute. The resulting foam was poured onto jute between two 3/16 inch metal bars 10 inches apart and was leveled by means of doctor blade. The resulting foam on the jute was cured at 260° F for 45 minutes. 2 × 2 inches samples of cured foamed latex were exposed to oven (270° F) and to the Carbon Arc Fade-O-Meter. After exposure, specimen colors and hours to embrittlement were determined. Embrittlement was determined by bending specimen back upon itself till jute side touched. Oven aged sample were allowed to cool at least one half hour before flexing.

Part A : SBR Latex
Part B : Filler
Part C : NH$_4$OH + Vulcanizing Agent

The latex is a cold SBR system utilizing a standard sulphur zinc curing agent with 120 pounds per 100 filler with a viscosity of 3000 cps (commonly used in foam carpet backing).

TABLE III

Carbon Arc Fadeometer Exposure 3/16" SBR Latex Foam on Jute

| Ex. No. | Concentration of Stabilizer | Hours to Embrittlement |
|---|---|---|
| 20 | None | 15 |
| 21 | 0.063% 4-benzamido-2,6-di-t-butylphenol | Ca. 35 |
| 22 | 0.063% 4-o-toluylamido-2,6-di-t-butylphenol | Ca. 35 |

The invention has been described with respect to certain preferred embodiments and various modifications and variations thereof will become obvious to persons skilled in the art. It is therefore to be understood that such modifications and variations are to be included within the spirit and scope of this invention.

What is claimed is :

1. A composition of matter comprising a diene rubber stabilized against oxidative deterioration with 0.05% to 2% by weight of the rubber of a compound having the formula

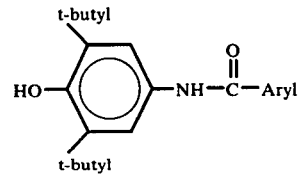

wherein aryl is phenyl, naphthyl or alkyl substituted phenyl where alkyl has up to 9 carbon atoms.

2. A composition according to claim 1 which is stabilized with 4-benzamido-2,6di-t-butylphenol.

3. A composition according to claim 1 which is stabilized with a 4-aroylamido-2,6-di-t-butylphenol and an ultraviolet light absorber.

4. A composition of claim 1 wherein polybutadiene, polyisoprene and butadiene-styrene copolymer is stabilized with 4-benzamido-2,6-di-t-butylphenol.

5. A composition of claim 1 wherein the stabilizer is 4-o-toluylamido-2,6-di-t-butylphenol.

* * * * *